(12) United States Patent
Lee et al.

(10) Patent No.: US 9,624,854 B2
(45) Date of Patent: Apr. 18, 2017

(54) METHOD AND APPARATUS FOR FUEL INJECTION OF ENGINE SYSTEM

(71) Applicant: Hyundai Motor Company, Seoul (KR)

(72) Inventors: JangSu Lee, Yongin-si (KR); Hyo Sang Cho, Suwon-si (KR); Hyoung Hyoun Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 105 days.

(21) Appl. No.: 14/797,994

(22) Filed: Jul. 13, 2015

(65) Prior Publication Data

US 2016/0138486 A1 May 19, 2016

(30) Foreign Application Priority Data

Nov. 17, 2014 (KR) .................. 10-2014-0160337

(51) Int. Cl.
| | |
|---|---|
| *F02D 41/30* | (2006.01) |
| *F02D 41/00* | (2006.01) |
| *F02D 41/02* | (2006.01) |
| *F02D 41/40* | (2006.01) |
| *F02D 13/02* | (2006.01) |
| *F02D 35/02* | (2006.01) |

(52) U.S. Cl.
CPC ....... *F02D 41/006* (2013.01); *F02D 13/0273* (2013.01); *F02D 35/023* (2013.01); *F02D 35/028* (2013.01); *F02D 41/024* (2013.01); *F02D 41/403* (2013.01)

(58) Field of Classification Search
CPC .... F02D 41/006; F02D 41/024; F02D 41/403; F02D 13/0273; F02D 35/028; F02D 35/023
USPC ............ 123/435, 299, 300, 90.15, 672, 676, 123/568.14; 701/103–105, 110–111; 73/35.12, 114.31, 114.33, 114.34, 114.37
See application file for complete search history.

(56) References Cited

FOREIGN PATENT DOCUMENTS

| | | |
|---|---|---|
| JP | 10-280978 A | 10/1998 |
| JP | 2005-282441 A | 10/2005 |
| JP | 2010-174738 A | 8/2010 |

*Primary Examiner* — Hai Huynh
(74) *Attorney, Agent, or Firm* — Morgan, Lewis & Bockius LLP

(57) ABSTRACT

A method for fuel injection of an engine system may include detecting driving information, including a combustion pressure in a combustion chamber, a heat generation amount in the combustion chamber, a crank angle, and a pressure/temperature/air amount of an intake manifold and an exhaust manifold, setting a fuel amount and injection timing with respect to a pilot injection as map data from an internal temperature, determining whether a maximum combustion pressure change rate is greater than a predetermined pressure change rate, determining generation timing of the maximum combustion pressure change rate, when the maximum combustion pressure change rate is greater than the predetermined pressure change rate, and decreasing a fuel amount of the pilot injection when the maximum combustion pressure change rate is generated during the pilot injection.

13 Claims, 9 Drawing Sheets

METHOD AND APPARATUS FOR FUEL INJECTION OF ENGINE SYSTEM

CROSS-REFERENCE TO RELATED APPLICATION

The present application claims priority to Korean Patent Application No. 10-2014-0160337 filed Nov. 17, 2014, the entire contents of which is incorporated herein for all purposes by this reference.

BACKGROUND OF THE INVENTION

Field of the Invention

The present invention relates to a method and an apparatus for fuel injection of an engine system. More particularly, the present invention relates to a method and an apparatus for fuel injection of an engine system that optimizes pilot injection in the engine system recirculating exhaust gas in a cylinder by a variable valve apparatus.

Description of Related Art

Generally, in order to reduce vibration/noise generated in an engine, pilot injection is introduced.

In the pilot injection, before an injector performs main injection for combustion, a predetermined amount of fuel is injected at a predetermined point in time so that temperature of a combustion chamber is raised and a mixture of fuel and air is improved. The pilot injection is performed at least once and may be multiply performed in accordance with a driving condition.

Through the pilot injection, ignition delay is reduced and a rate of increase of combustion pressure can be reduced. As the rate of increase of the combustion pressure is reduced, combustion noise can be reduced.

Furthermore, in order to implement an appropriate valve operation in accordance with the RPM of the engine, a Variable Valve Lift (VVL) apparatus that has a plurality of shapes of cams operating valves or that operates valves at different lifts in accordance with the RPM of an engine has been studied.

The engine provided in the variable valve apparatus may resupply exhaust gas exhausted from a combustion chamber to the combustion chamber by opening an exhaust valve during an intake stroke (hereinafter called 'internal EGR (exhaust gas recirculation)').

However, when the exhaust gas is recirculated to the combustion chamber through the variable valve apparatus, the temperature of the combustion chamber is changed, and the fuel amount and injection timing of the pilot injection should be changed. Therefore, when the exhaust gas is resupplied to the combustion chamber through the variable valve apparatus, it needs to optimize a combustion state through exactly controlling the fuel amount and the injection timing of the pilot injection.

The above information disclosed in this Background section is only for enhancement of understanding of the background of the invention and therefore it may contain information that does not form the prior art that is already known in this country to a person of ordinary skill in the art.

BRIEF SUMMARY

Various aspects of the present invention are directed to providing a method for fuel injection of an engine system that optimizes a combustion state through exactly controlling a fuel amount and injection timing of pilot injection.

According to various aspects of the present invention, a method for fuel injection of an engine system may include detecting driving information, by a controller, including a combustion pressure in a combustion chamber, a heat generation amount in the combustion chamber, a crank angle, and a pressure/temperature/air amount of an intake manifold and an exhaust manifold, setting a fuel amount, by the controller, and injection timing with respect to a pilot injection as map data from an internal temperature, in which the internal temperature is modeled from the pressure/temperature/air amount of the intake manifold and the exhaust manifold, and an exhaust gas recirculation amount by a variable valve apparatus, determining, by the controller, whether a maximum combustion pressure change rate is greater than a predetermined pressure change rate, determining, by the controller, generation timing of the maximum combustion pressure change rate, when the maximum combustion pressure change rate is greater than the predetermined pressure change rate, and decreasing a fuel amount of the pilot injection, by the controller, when the maximum combustion pressure change rate is generated during the pilot injection.

The method for fuel injection may further include determining, by the controller, whether a combustion delay of main injection fuel is generated when the maximum combustion pressure change rate is less than the predetermined pressure change rate, and determining, by the controller, a fuel amount and injection timing of the pilot injection according to a predetermined value of the map data when the combustion delay of the main injection fuel is not generated.

The method for fuel injection may further include determining, by the controller, whether independent heat generation by each pilot injection occurs when the combustion delay of the main injection fuel occurs, and increasing, by the controller, an injection period of each pilot injection compared to a predetermined injection period of the map data when the independent heat generation by each pilot injection does not occur.

The method for fuel injection may further include determining, by the controller, whether an entire heat generation amount of pilot injection satisfies a target heat generation amount when the independent heat generation by each pilot injection occurs, and increasing, by the controller, a fuel amount by the pilot injection to greater than a predetermined fuel amount of the map data when the entire heat generation amount of pilot injection does not satisfy the target heat generation amount.

The method for fuel injection further including determining, by the controller, a fuel amount and injection timing of the pilot injection according to the map data when the entire heat generation amount of pilot injection satisfies the target heat generation amount.

The method for fuel injection may further include determining, by the controller, whether independent heat generation by each pilot injection occurs when the maximum combustion pressure change rate is generated during the main injection, and increasing, by the controller, an injection period of each pilot injection to be greater than a predetermined injection period of the map data when the independent heat generation by each pilot injection does not occur.

The method for fuel injection may further include determining, by the controller, whether the entire heat generation amount of pilot injection satisfies the target heat generation amount when the independent heat generation by each pilot injection occurs, and increasing, by the controller, the fuel amount of the pilot injection to be greater than the predetermined fuel amount of the map data when the entire heat generation amount of pilot injection does not satisfy the target heat generation amount.

The method for fuel injection may further include determining, by the controller, the fuel amount and the injection timing of the pilot injection according to the predetermined value of the map data when the entire heat generation amount of pilot injection satisfies the target heat generation amount.

The generation timing of the maximum combustion pressure change rate may be determined from a crank angle at which the combustion pressure change rate is maximized.

A heat generation amount of initial pilot injection may be determined by summing heat generation amounts from combustion start timing to timing at which the differential value of the heat release rate initially becomes zero, and the heat generation amount by the pilot injection after the initial pilot injection may be determined by summing the heat generation amounts of each period at which the differential value of the heat release rate is zero.

The entire heat generation amount of pilot injection may be determined from a mass fraction burned 10% (MFB10).

The combustion delay of the main injection fuel may be determined by using mass fraction burned 50% (MFB50).

According to various aspects of the present invention, an apparatus for fuel injection of an engine system may include an engine including a combustion chamber configured to supply a driving torque by combustion of fuel, an intake manifold, and an exhaust manifold, at least one exhaust valve configured to open and close the combustion chamber, a variable valve apparatus configured to adjust opening timing and a lift of the exhaust valve, a driving information detector configured to detect driving information including a combustion pressure in the combustion chamber, a heat generation amount in the combustion chamber, a crank angle, and a pressure/temperature/air amount of an intake manifold and an exhaust manifold, and a controller configured to control a fuel amount and injection timing of pilot injection by using a maximum combustion pressure change rate, generation timing of the maximum combustion pressure change rate, a combustion delay of fuel by main injection, and a combustion delay of fuel by pilot injection, in which the controller is configured to be operated by a program set for performing the aforementioned methods of the present invention.

According to various embodiments of the present invention, since a fuel amount and injection timing of pilot injection are controlled by using a maximum combustion pressure change rate, generation timing of the maximum combustion pressure change rate, a combustion delay of fuel by main injection, and a combustion delay of fuel by pilot injection, it is possible to obtain combustion stability.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
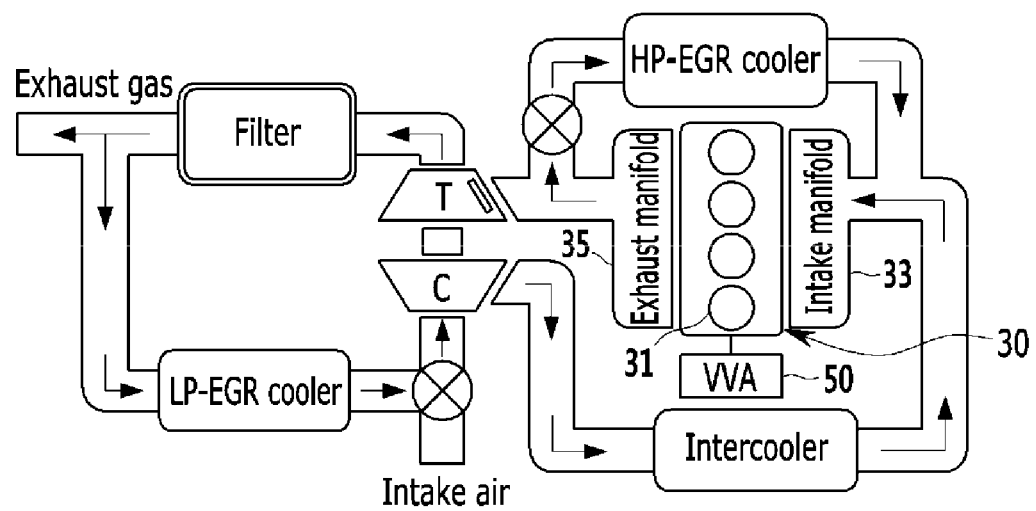
FIG. 1 is a schematic view illustrating an exemplary fuel injection system of an engine according to the present invention.
Figure 2:
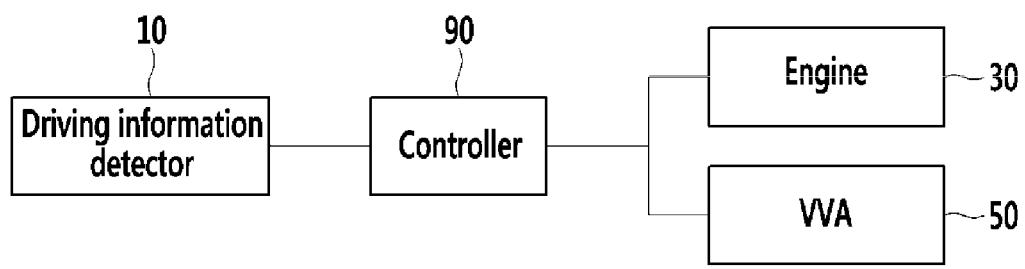
FIG. 2 is block diagram illustrating the exemplary fuel injection system of the engine according to the present invention.

As shown in FIG. 1 and FIG. 2, an apparatus for a fuel injection of an engine system according to various embodiments of the present invention includes an engine 30, a driving information detector 10 that detects various driving information of the engine 30, and a controller 90 controlling a fuel amount and injection timing of pilot injection by using the driving information detected by the driving information detector 10.

The engine 30 includes a combustion chamber 31 supplying driving torque by combustion of a fuel. The combustion chamber 31 includes at least one intake valve selectively resupplying fuel into the combustion chamber 31 and at least one exhaust valve selectively exhausting exhaust gas from the combustion chamber 31.

Opening timing and lift of the intake valve and the exhaust valve are adjusted by a variable valve apparatus (VVA) 50.

The opening timing and the closing timing of the intake valve and the exhaust valve are operated by rotation of a crankshaft, and the continuously variable valve timing apparatus advances or retards the opening timing and the closing timing through the controller 90

A crank angle of the crankshaft is supplied to the controller 90.

The variable valve apparatus 50 is well known to a skilled person, and hence no detailed description will be provided.

Figure 3:
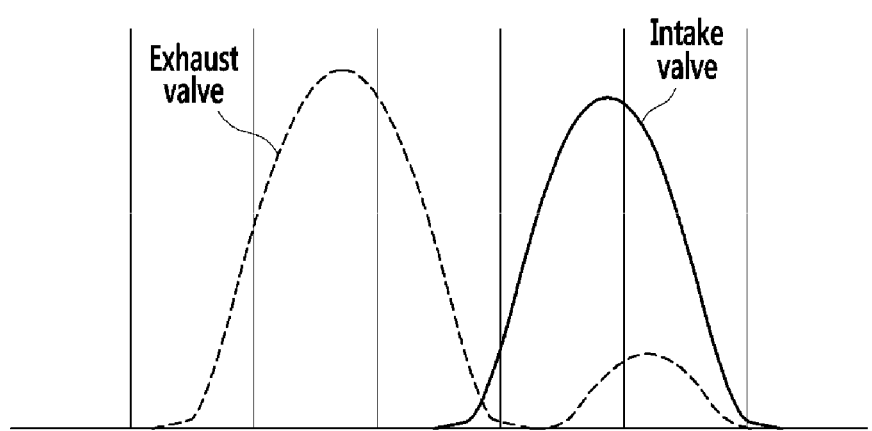
FIG. 3 is a graph illustrating phases of an intake valve and an exhaust valve according to the present invention.

As shown in FIG. 3, the variable valve apparatus 50 opens the exhaust valve during an intake stroke of the combustion chamber 31 when a driving condition, for example a case in which a catalyst temperature of an exhaust gas purification apparatus is increased, corresponds to a predetermined driving condition.

When the exhaust valve is opened during the intake stroke, the exhausted exhaust gas is resupplied to the combustion chamber 31. The exhaust gas resupplied to the combustion chamber 31 is exhausted to the exhaust gas purification apparatus at a next exhaust stroke through a compression stroke. In this state, the temperature of the re-exhausted exhaust gas is increased, the temperature of a catalyst provided in the exhaust gas purification apparatus is increased by the increased exhaust gas temperature, and thereby a purification rate of the exhaust gas is increased.

The controller 90 controls a fuel amount and injection timing of pilot injection by using a maximum combustion pressure change rate, generation timing of the maximum combustion pressure change rate, a combustion delay of fuel by main injection, and a combustion delay of fuel by the pilot injection.

According to various embodiments of the present invention, the pilot injection and the main injection may be multiply performed in order to increase combustion efficiency and improve exhaustion efficiency of exhaust gas.

The controller 90 may be implemented by one or more processors operated by a predetermined program, in which the predetermined program is set to perform steps of the method for the fuel injection of the engine system according to various embodiments of the present invention.

Hereinafter, referring to FIG. 4 and FIG. 5, a method for controlling the fuel amount and the injection timing of the pilot injection will be described in detail.

FIG. 4A to FIG. 4E are graphs illustrating an injection signal with respect to a crank angle, a pressure change rate, a heat release rate, a heat release rate change rate, and a heat generation amount. In FIG. 4A to FIG. 4E, a solid line is a curve representing that the exhaust valve is opened by a variable valve apparatus during an intake stroke, and a dotted line is a curve representing that the variable valve apparatus is not operated.

Figure 4A:
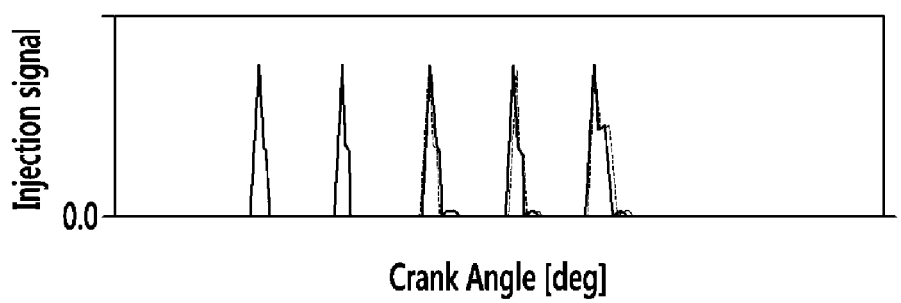
FIG. 4A, FIG. 4B, FIG. 4C, FIG. 4D and FIG. 4E are graphs illustrating an injection signal with respect to a crank angle, a pressure change rate, a heat release rate, a heat release rate change rate, and a heat generation amount.

FIG. 4A is a graph illustrating injection signals with respect to a crank angle, where the first two injection signals are pilot injection signals, and the next three signals are main injection signals.

Figure 4B:
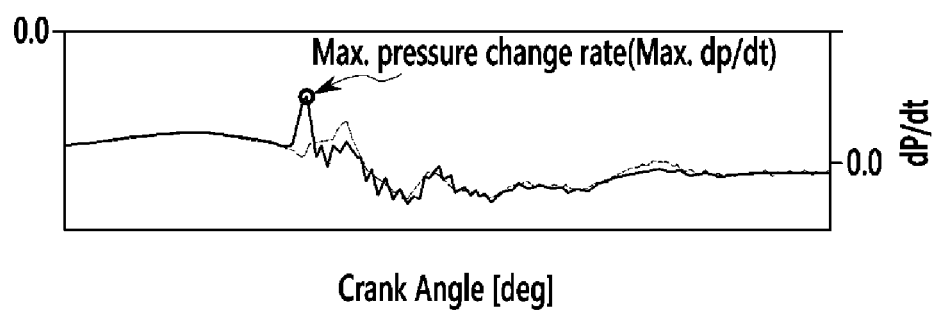

FIG. 4B is a graph illustrating a pressure change rate (dP/dt) in the combustion chamber 31 with respect to the crank angle. In FIG. 4B, the maximum pressure change rate (Max dP/dt) is generated in the second pilot injection.

Figure 4C:
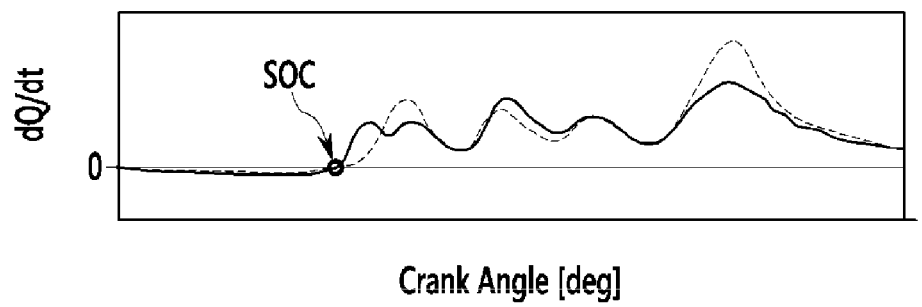

FIG. 4C is a graph illustrating a heat release rate (dQ/dt) in the combustion chamber 31 with respect to a crank angle, Q0 where the heat release rate initially becomes greater than zero is a start of combustion (SOC), and it is possible to detect a combustion delay time from the SOC.

Figure 4D:
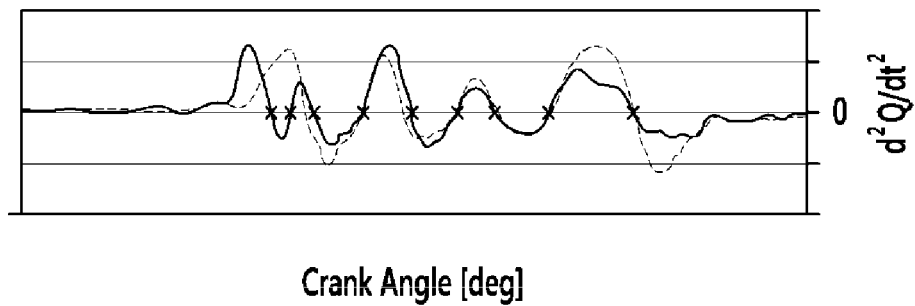

FIG. 4D is a graph illustrating a differential value ($d^2Q/dt^2$) of the heat release rate with respect to a crank angle, where it is possible to calculate an accumulated heat release rate through each point (referring to 'x' in FIG. 4D) of the differential value of the heat release rate for each fuel injection.

Figure 4E:
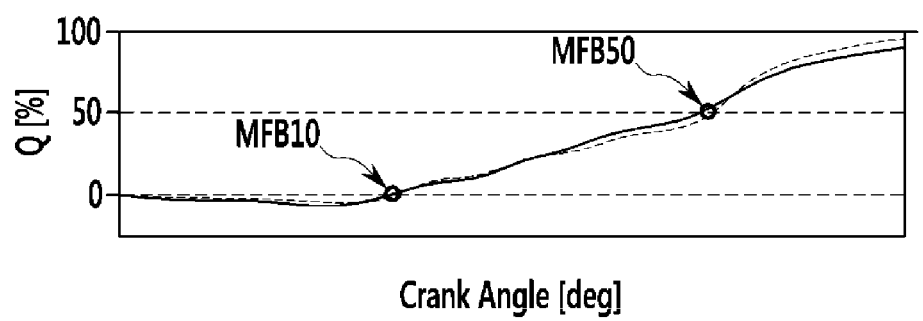

FIG. 4E is a graph illustrating a heat generation amount with respect to a crank angle. Mass fraction burned 10% (MFB 10) is a determination criteria of combustion end time of the pilot injection fuel, and mass fraction burned 50% (MFB50) is a determination criteria of combustion delay of the main injection fuel. The mass fraction burned (MFB) means the ratio of the amount of combustion heat at a specific point of time of the total amount of combustion heat.

That is, when the measure MFB10 or MFB50 is later than a predetermined time, it is possible to determine that combustion of the pilot injection fuel or combustion of the main injection fuel is delayed.

As shown in FIG. 4A to FIG. 4E, when the exhaust gas is resupplied into the combustion chamber 31 by the variable valve apparatus 50, each control signal is different from when the variable valve apparatus 50 is not operated. Therefore, when the variable valve apparatus 50 is operated, it needs to exactly control the fuel amount and the injection timing of the pilot injection according to control parameters.

Figure 5:
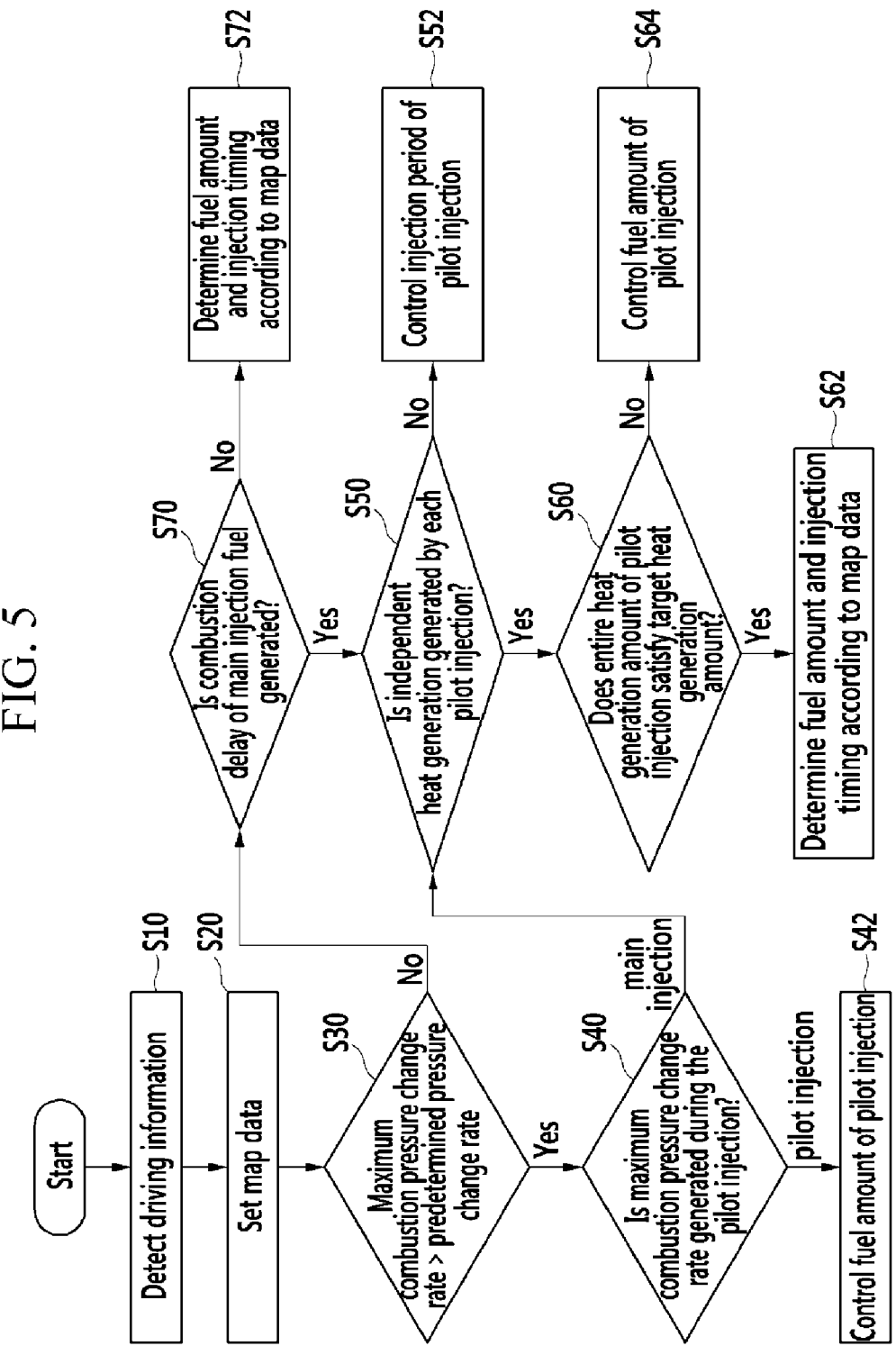
FIG. 5 is a flowchart of an exemplary fuel injection method of an engine according to the present invention.

FIG. 5 is a flowchart of a fuel injection method of an engine according to various embodiments of the present invention.

Referring to FIG. 5, the driving information detector 10 detects driving information including a combustion pressure in the combustion chamber 31, a heat generation amount in the combustion chamber 31, a crank angle, and a pressure/temperature/air amount of an intake manifold 33 and an exhaust manifold 35 (see FIG. 1). The detected driving information is supplied to the controller 90 at step S10.

The controller 90 models an internal temperature of the combustion chamber 31 from the pressure/temperature/air amount of the intake manifold 33 and the exhaust manifold 35 detected by the driving information detector 10 and exhaust gas recirculation amount by the variable valve apparatus 50, and sets the fuel amount and the injection timing of the pilot injection from the internal temperature of the combustion chamber 31 as map data at step S20.

The controller 90 determines whether the maximum combustion pressure change rate is greater than a predetermined pressure change rate at step S30.

The controller 90 determines whether the maximum combustion pressure change rate is generated during the pilot injection when the maximum combustion pressure change rate is greater than the predetermined pressure change rate at step S40.

When the maximum combustion pressure change rate is generated during the pilot injection, the controller 90 reduces fuel amount of the pilot injection to be less than a predetermined fuel amount of the map data at step S42.

As the maximum combustion pressure change rate is increased, combustion noise of the engine 30 is increased. A combustion state of the combustion chamber 31 may be indirectly determined according to generation timing of the maximum combustion pressure change rate.

Since recirculating exhaust gas by the variable valve apparatus 50 excessively increases the internal temperature of the combustion chamber 31 and accordingly combustion delay time is decreased, the maximum combustion pressure change rate is generated during the pilot injection. Therefore, the controller decreases the fuel amount of the pilot injection as much as necessary when increasing the internal temperature of the combustion chamber during main injection.

In the S30, when the maximum combustion pressure change rate is less than the predetermined pressure change rate, the controller 90 determines whether the combustion delay of the main injection fuel is generated at step S70. The combustion delay of the main injection fuel may be determined by using the mass fraction burned 50% (MFB50).

If the combustion delay of the main injection fuel is generated, instability of combustion and misfire may be generated by the excessive combustion delay. Therefore, when the combustion delay of the main injection fuel is generated, the controller moves to the step S50, determines combustion status of the pilot injection, and controls the injection timing or the fuel amount of the pilot injection.

However, when the combustion delay of the main injection fuel is not generated, the controller 90 does not separately control the pilot injection, and determines the fuel amount and the injection timing of the pilot injection according to the predetermined value of the map data at step S72.

Also, when the maximum combustion pressure change rate is generated during the main injection in the step S40, the controller 90 determines the combustion status of each pilot injection at step S50. In other words, the controller 90 determines whether independent heat generation is generated by each pilot injection at step S50.

At this time, a heat generation amount of an initial pilot injection is calculated by summing heat generation amounts from combustion start timing to timing when the differential value of the heat release rate initially becomes zero. And the heat generation amount by the pilot injection after the initial pilot injection is calculated by summing the heat generation amounts of each period in which the differential values of the heat release rates are zero.

The combustion start timing may be set as the crank angle when the heat release rate becomes greater than zero.

When the independent heat generation is generated by each pilot injection, the controller 90 determines whether the entire heat generation amount of pilot injection satisfies a target heat generation amount at step S60.

The entire heat generation amount of pilot injection may be determined from the mass fraction burned 10% (MFB10).

When the entire heat generation amount of the pilot injection does not satisfy the target heat generation amount, the controller 90 increases fuel amount by the pilot injection at step S64. When the entire heat generation amount of the pilot injection satisfies the target heat generation amount, the controller 90 does not additionally control the pilot injection, and determines the fuel amount and the injection timing according to a predetermined value set in the map data at step S62.

When the independent heat generation is not generated by each pilot injection in the step S50, the controller 90 increases an injection period of the pilot injection at step S52. That is, the controller 90 increases the injection period of each pilot injection so that the independent heat generation is generated by each pilot injection when the independent heat generation is not generated by each pilot injection.

Since the combustion delay time is excessive, the plurality of pilot injections separately injected are not independently combusted but are simultaneously combusted. At this time, it is highly likely that the maximum combustion pressure change rate may be generated during main injection. Therefore, if the fuel amount of the pilot injection is simply decreased, it is difficult to sufficiently increase the internal temperature of the combustion chamber 31 during the main injection. And combustion delay of main injection fuel is highly likely to occur. Therefore, it needs to control the injection period of the pilot injection in order to obtain controllability.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for fuel injection of an engine system, comprising:
   detecting driving information, by a controller, including a combustion pressure in a combustion chamber, a heat generation amount in the combustion chamber, a crank angle, and a pressure/temperature/air amount of an intake manifold and an exhaust manifold;
   setting a fuel amount, by the controller, and injection timing with respect to a pilot injection as map data from an internal temperature, wherein the internal temperature is modeled from the pressure/temperature/air amount of the intake manifold and the exhaust manifold, and an exhaust gas recirculation amount by a variable valve apparatus;
   determining, by the controller, whether a maximum combustion pressure change rate is greater than a predetermined pressure change rate;
   determining, by the controller, generation timing of the maximum combustion pressure change rate, when the maximum combustion pressure change rate is greater than the predetermined pressure change rate; and
   decreasing a fuel amount of the pilot injection, by the controller, when the maximum combustion pressure change rate is generated during the pilot injection.

2. The method for the fuel injection of the engine system of claim 1, further comprising:
   determining, by the controller, whether a combustion delay of main injection fuel is generated when the maximum combustion pressure change rate is less than the predetermined pressure change rate; and
   determining, by the controller, a fuel amount and injection timing of the pilot injection according to a predetermined value of the map data when the combustion delay of the main injection fuel is not generated.

3. The method for the fuel injection of the engine system of claim 2, further comprising:
   determining, by the controller, whether an independent heat generation by each pilot injection occurs when the combustion delay of the main injection fuel occurs; and
   increasing, by the controller, an injection period of each pilot injection compared to a predetermined injection period of the map data when the independent heat generation by the each pilot injection does not occur.

4. The method for the fuel injection of the engine system of claim 3, further comprising:
   determining, by the controller, whether an entire heat generation amount of the pilot injection satisfies a target heat generation amount when the independent heat generation by the each pilot injection occurs; and
   increasing, by the controller, a fuel amount by the pilot injection to greater than a predetermined fuel amount of the map data when the entire heat generation amount of the pilot injection does not satisfy the target heat generation amount.

5. The method for the fuel injection of the engine system of claim 4, further comprising
   determining, by the controller, a fuel amount and injection timing of the pilot injection according to the map data when the entire heat generation amount of pilot injection satisfies the target heat generation amount.

6. The method for the fuel injection of the engine system of claim 4, wherein
the entire heat generation amount of the pilot injection is determined from a mass fraction burned 10% (MFB10).

7. The method for the fuel injection of the engine system of claim 3, wherein
a heat generation amount of an initial pilot injection is determined by summing heat generation amounts from a combustion start timing to a timing at which a differential value of a heat release rate initially becomes zero, and
the heat generation amount by the pilot injection after the initial pilot injection is determined by summing the heat generation amounts of each period at which the differential value of the heat release rate is zero.

8. The method for the fuel injection of the engine system of claim 3, wherein the combustion delay of the main injection fuel is determined by using mass fraction burned 50% (MFB50).

9. The method for the fuel injection of the engine system of claim 1, further comprising:
determining, by the controller, whether an independent heat generation by each pilot injection occurs when the maximum combustion pressure change rate is generated during the main injection; and
increasing, by the controller, an injection period of the each pilot injection to be greater than a predetermined injection period of the map data when the independent heat generation by the each pilot injection does not occur.

10. The method for the fuel injection of the engine system of claim 9, further comprising:
determining, by the controller, whether the entire heat generation amount of the pilot injection satisfies the target heat generation amount when the independent heat generation by the each pilot injection occurs; and
increasing, by the controller, the fuel amount of the pilot injection to be greater than the predetermined fuel amount of the map data when the entire heat generation amount of the pilot injection does not satisfy the target heat generation amount.

11. The method for the fuel injection of the engine system of claim 10, further comprising
determining, by the controller, the fuel amount and the injection timing of the pilot injection according to the predetermined value of the map data when the entire heat generation amount of the pilot injection satisfies the target heat generation amount.

12. The method for the fuel injection of the engine system of claim 1, wherein
generation timing of the maximum combustion pressure change rate is determined from a crank angle at which the combustion pressure change rate is maximized.

13. An apparatus for fuel injection of an engine system, comprising:
an engine including a combustion chamber supplying a driving torque by combustion of fuel, an intake manifold, and an exhaust manifold;
at least one exhaust valve opening and closing the combustion chamber;
a variable valve apparatus adjusting an opening timing and a lift of the exhaust valve;
a driving information detector detecting driving information including a combustion pressure in the combustion chamber, a heat generation amount in the combustion chamber, a crank angle, and a pressure/temperature/air amount of the intake manifold and the exhaust manifold; and
a controller controlling a fuel amount and an injection timing of pilot injection by using a maximum combustion pressure change rate, generation timing of the maximum combustion pressure change rate, a combustion delay of fuel by main injection, and a combustion delay of fuel by the pilot injection,
wherein the controller is configured to be operated by a program set for performing the method of claim 1.

* * * * *